US007555520B2

(12) United States Patent
Watanabe et al.

(10) Patent No.: US 7,555,520 B2
(45) Date of Patent: Jun. 30, 2009

(54) SERVER APPARATUS AND METHOD FOR ELECTRONIC MAIL TRANSMISSION CONTROL

(75) Inventors: Shinichi Watanabe, Kanagawa (JP); Toshio Nagatsuka, Kanagawa (JP); Keiji Tanaka, Kanagawa (JP)

(73) Assignee: Panasonic Communications Co., Ltd., Fukuoka (JP)

( * ) Notice: Subject to any disclaimer, the term of this patent is extended or adjusted under 35 U.S.C. 154(b) by 514 days.

(21) Appl. No.: 09/993,486

(22) Filed: Nov. 27, 2001

(65) Prior Publication Data

US 2002/0069254 A1 Jun. 6, 2002

(30) Foreign Application Priority Data

Dec. 1, 2000 (JP) ............................ 2000-366839

(51) Int. Cl.
*G06F 15/16* (2006.01)

(52) U.S. Cl. ...................... 709/206; 709/217; 709/245; 379/88.13

(58) Field of Classification Search ......... 709/204–207, 709/217, 203, 238, 245; 455/466; 358/1.15; 379/88.13; 370/356
See application file for complete search history.

(56) References Cited

U.S. PATENT DOCUMENTS 5,872,845 A 2/1999 Feder
5,881,233 A * 3/1999 Toyoda et al. ............... 709/233
5,987,508 A * 11/1999 Agraharam et al. ......... 709/217
6,266,160 B1 * 7/2001 Saito et al. .................. 358/407
6,330,070 B1 * 12/2001 Toyoda et al. ............. 358/1.15
6,335,966 B1 1/2002 Toyoda
6,384,927 B1 * 5/2002 Mori ......................... 358/1.15
6,385,195 B2 * 5/2002 Sicher et al. ................ 370/356
6,438,217 B1 * 8/2002 Huna ...................... 379/88.14
6,539,077 B1 * 3/2003 Ranalli et al. .............. 379/67.1
6,609,006 B1 * 8/2003 Mori .......................... 455/466
6,625,258 B1 * 9/2003 Ram et al. ............... 379/88.13
6,735,617 B1 * 5/2004 Goodman ................... 709/206

(Continued)

FOREIGN PATENT DOCUMENTS

EP 967779 A2 * 12/1999

(Continued)

OTHER PUBLICATIONS

RFC 821. Simple Mail Transfer Protocol, by Jonathan B. Postel, Aug. 1982, Information Sciences Institute, University of Southern California.*

(Continued)

*Primary Examiner*—Saleh Najjar
*Assistant Examiner*—Faruk Hamza
(74) *Attorney, Agent, or Firm*—Greenblum & Bernstein, P.L.C.

(57) ABSTRACT

A server apparatus and a method for electronic mail transmission control are provided that enables electronic mail communication, even if a user does not know information regarding destination, such as a mail account, in advance. The server apparatus includes a receiver that receives an electronic mail data including a destination telephone number from a sender terminal. A memory section stores at least one telephone number and at least one IP address in association with each other. A transmitter obtains an IP address that is pre-associated with the destination telephone number from the memory section and transmits the electronic mail data to the obtained IP address.

13 Claims, 8 Drawing Sheets

U.S. PATENT DOCUMENTS

| | | | | |
|---|---|---|---|---|
| 6,748,057 | B2 * | 6/2004 | Ranalli et al. | 379/88.17 |
| 6,757,732 | B1 * | 6/2004 | Sollee et al. | 709/227 |
| 6,763,226 | B1 * | 7/2004 | McZeal, Jr. | 455/90.2 |
| 6,944,273 | B2 * | 9/2005 | Huna | 379/88.14 |

FOREIGN PATENT DOCUMENTS

| | | |
|---|---|---|
| JP | 2000-004341 | 1/2000 |
| JP | 2000-041131 | 2/2000 |
| JP | 2000-066973 | 3/2000 |

OTHER PUBLICATIONS

RFC 822. Standard for the Format of ARPA Internet Text Messages Aug. 13, 1982 Revised by David H. Crocker Dept. of Electrical Engineering University of Delaware, Newark, DE 19711.*

RFC 821, Simple Mail Transfer Protocol, Jonathan B. Postel, Aug. 1982.*

English Language Abstract of JP 2000-66973.

English Language Abstract of JP 2000-41134.

English Language Abstract of JP 2000-04341.

English language Abstract of JP 2000-004341.

* cited by examiner

Fig. 3

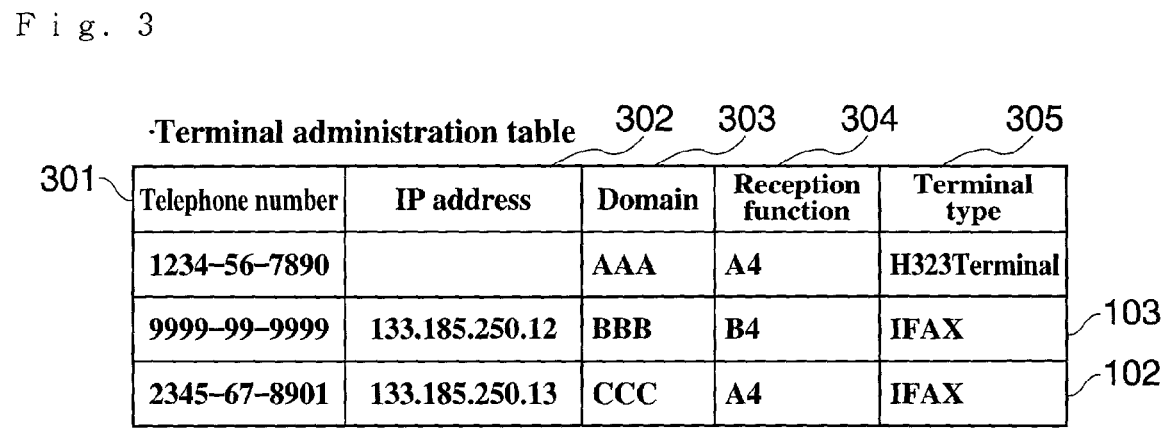

·Terminal administration table

| Telephone number | IP address | Domain | Reception function | Terminal type |
|---|---|---|---|---|
| 1234-56-7890 | | AAA | A4 | H323Terminal |
| 9999-99-9999 | 133.185.250.12 | BBB | B4 | IFAX |
| 2345-67-8901 | 133.185.250.13 | CCC | A4 | IFAX |

Fig. 4

· Telephone number / Address administration table

| Telephone number | IP address |
|---|---|
| 1234-56-7890 | 133.185.250.11 |
| 9999-99-9999 | 133.185.250.12 |
| 2345-67-8901 | 133.185.250.13 |

Fig. 5

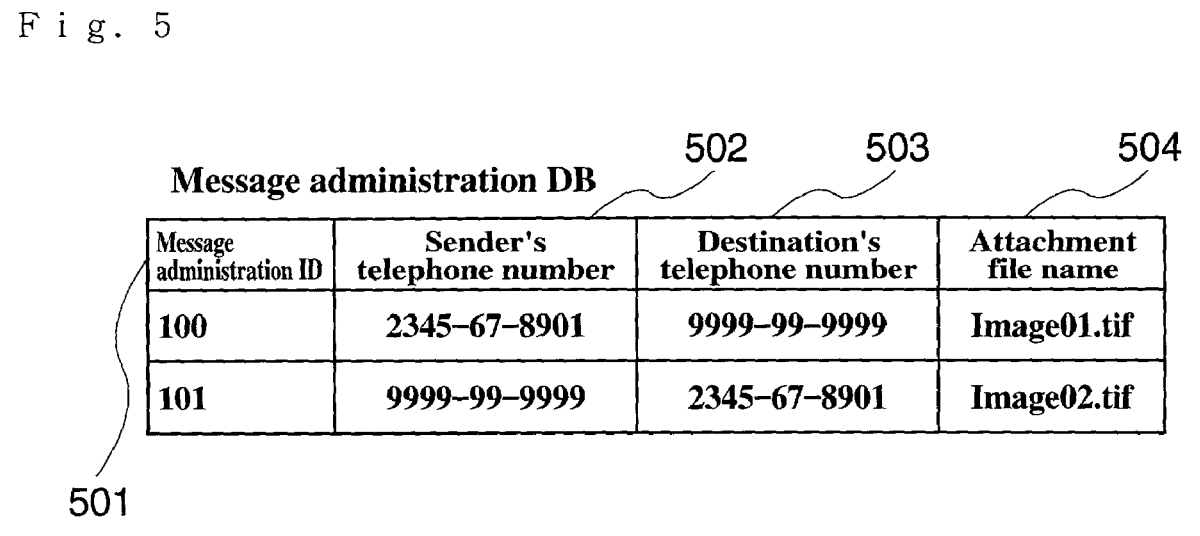

Message administration DB

| Message administration ID | Sender's telephone number | Destination's telephone number | Attachment file name |
|---|---|---|---|
| 100 | 2345-67-8901 | 9999-99-9999 | Image01.tif |
| 101 | 9999-99-9999 | 2345-67-8901 | Image02.tif |

SERVER APPARATUS AND METHOD FOR ELECTRONIC MAIL TRANSMISSION CONTROL

BACKGROUND OF THE INVENTION

1. Field of the Invention

This invention relates to a server apparatus and a method for electronic mail transmission control.

2. Description of Related Art

Conventionally, electronic mail communications are ordinarily carried out such that electronic mail communications are carried out directly between terminals in accordance with the SMTP (Simple Mail Transfer Protocol) protocol and an electronic mail transmitted to a mail server is received by a destination terminal in accordance with the POP3 (Post Office Protocol version 3) protocol.

However, in cases in which an electronic mail communication is carried out in accordance with the above described protocols, there is a problem that certain information regarding the destination of an electronic mail, such as a mail account, etc. must be known to the sender in advance. More specifically, when the SMTP protocol is followed, an IP address and a mail account must be known; and when the POP 3 is used, a mail account must be known.

Accordingly, the present invention is provided in view of the foregoing problems, and an object of the present invention is to provide a server apparatus and a method for control of electronic mail transmission using the server apparatus, which enables an electronic mail communication without knowing in advance, information about the destination, such as an electronic mail account, etc.

SUMMARY OF THE INVENTION

To achieve the above and/or other goals, the present invention provides a server apparatus that receives electronic mail data including a destination telephone number, from a sender electronic mail transmission terminal, that obtains an IP address that is pre-associated with the destination telephone number from a memory section that stores at least one telephone number and at least one IP address in association with each other, and that transmits the electronic mail data to the obtained IP address.

In this way, since the IP address that is pre-associated with the telephone number designated by the sender electronic mail transmission terminal is obtained at the server apparatus, an electronic communication can be carried out without knowing the information about destination, such as an electronic mail account, etc., in advance.

A feature of the present invention relates to a server apparatus connected to a transmitting IP apparatus, the transmitting IP apparatus transmitting an e-mail to a receiving IP apparatus via the server apparatus. The server apparatus includes a memory configured to store an IP address of the receiving IP apparatus associated with a telephone number of the receiving IP apparatus. A receiver is configured to receive the e-mail from the transmitting IP apparatus, the e-mail including the telephone number of the receiving IP apparatus. An analyzer is configured to obtain, from the received e-mail, the telephone number of the receiving IP apparatus, and to obtain, from the memory, the IP address of the receiving IP apparatus associated with the telephone number of the receiving IP apparatus. A transmitter is configured to transmit the received e-mail to the receiving IP apparatus, based on the IP address of the receiving IP apparatus.

A further feature of the present invention relates to a communication system that includes a transmitting IP apparatus and a server apparatus. The transmitting IP apparatus includes a panel configured to input a telephone number of a receiving IP apparatus and a transmitter configured to transmit, to the server apparatus, an e-mail including the input telephone number of the receiving IP apparatus. The input telephone number of the receiving IP apparatus is set in the transmitting e-mail. The server apparatus includes a memory configured to store an IP address of the receiving IP apparatus associated with the telephone number of the receiving IP apparatus and an analyzer configured to receive the e-mail from the transmitting IP apparatus, to obtain, from the received e-mail, the telephone number of the receiving IP apparatus, and to obtain, from the memory, the IP address of the receiving IP apparatus associated with the telephone number of the receiving IP apparatus. The server includes a transmitter configured to transmit the received e-mail to the receiving IP apparatus, based on the IP address of the receiving IP apparatus.

A yet further aspect of the present invention relates to a method for controlling an e-mail transmission using a server apparatus. The method includes storing, at the server apparatus, an IP address of a receiving IP apparatus associated with a telephone number of the receiving IP apparatus and receiving, from a transmitting IP apparatus, an e-mail, the e-mail including the telephone number of the receiving IP apparatus. The method further includes obtaining, from the received e-mail, the telephone number of the receiving IP apparatus, obtaining, from the memory, the IP address of the receiving IP apparatus associated with the telephone number of the receiving IP apparatus and transmitting the received e-mail from the server apparatus to the receiving IP apparatus, based on the IP address of the receiving IP apparatus.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, wherein:

FIG. 3 illustrates an example of data registered in a terminal administration table in the server apparatus of the embodiment according to the present invention;

FIG. 4 illustrates an example of data registered in a telephone number/IP address administration table in the H.323 gatekeeper that is in communication with the server apparatus of the embodiment according to the present invention;

FIG. 5 illustrates an example of data registered in the message administration DB in the server apparatus of the embodiment according to the present invention;

DETAILED DESCRIPTION OF THE PREFERRED EMBODIMENTS

An embodiment of the present invention will be explained with reference to the accompanying drawings below.

Figure 1:
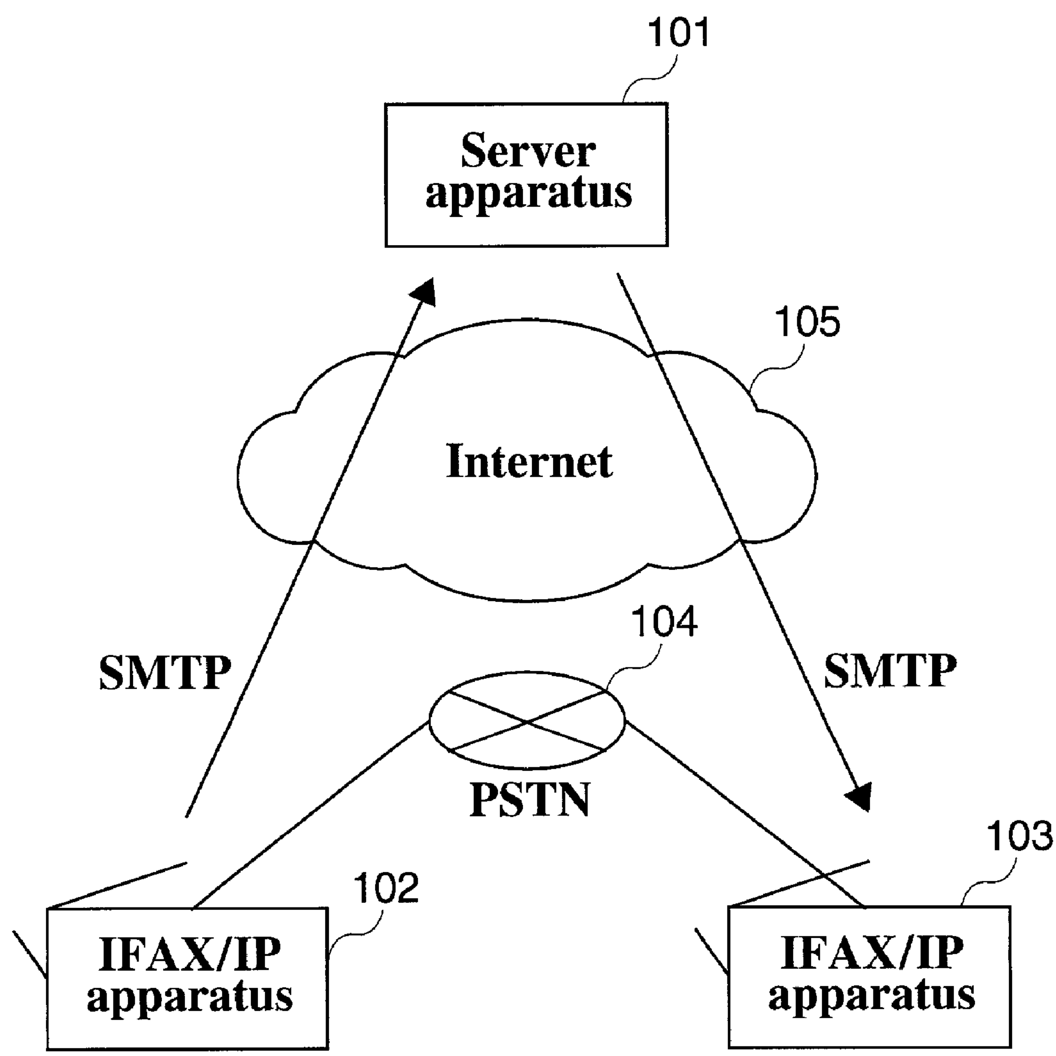
FIG. 1 is a schematic diagram showing a network in which a server apparatus of an embodiment according to the present invention operates.

FIG. 1 is a schematic diagram showing a network in which a server apparatus of an embodiment of the present invention operates.

As shown in FIG. 1, a server apparatus 101 of this embodiment is connected to an apparatus that manages and executes sending and receiving of electronic mail in accordance with IP addresses (hereinafter called as "IP apparatus"). An IP apparatus can be any terminal that is capable of an electronic communication function, such as a personal computer, a PDA, etc. However, in this embodiment, a non-limiting example will be explained in which Internet facsimile apparatuses (hereinafter called as "IFAX(es)") 102 and 103 are connected as IP apparatuses. These IFAXes 102 and 103 are constructed in the same way as the IFAXes disclosed in Japanese Laid-Open Patent Application No. Hei 8-242326 in U.S. Pat. No. 5,881,233 are constructed.

The IFAXes 102 and 103 are connected to the server apparatus 101 through the Internet 105 by a dial-up connection to a predetermined provider through the Public Switched Telephone Network ("PSTN") 104.

Here, when an electronic mail transmission process is executed, the IP apparatus (IFAXes 102 and 103 in this embodiment), which is connected to this server apparatus 101 always accesses this server apparatus 101 and transmits a message (subject) to be transmitted to the server apparatus 101. Using this particular feature, this server apparatus 101 can send an electronic mail even in the situation where an operator of the sender IP apparatus does not know the information regarding the destination, such as a mail account, etc. More specifically, the destination will be identified by a telephone number input by the operator of the sender IP apparatus and an electronic mail will be transmitted to the identified destination.

Explaining this more specifically with regard to the case in which the IFAX 102 is the sender and the IFAX 103 is the destination, when a telephone number of the IFAX 103 is input by an operator, the IFAX 102 transmits an electronic mail including the telephone number in header information, to the server apparatus 101 in accordance with the SMTP protocol. The server apparatus 101 recognizes the telephone number contained in the header information of the electronic mail as identifying the IP address of the IFAX 103, which is the destination of the electronic mail; and thereafter, transmits the received electronic mail message to the IFAX 103 in accordance with the SMTP protocol.

Incidentally, each IP apparatus, which is connected to the server apparatus 101, has, for electronic mail transmission, its own telephone number as a user name, which is a part of the sender electronic mail address. That is, if the telephone number is 012-3456-7890, "01234567890@domain name" will be registered as its own electronic mail address.

Figure 2:
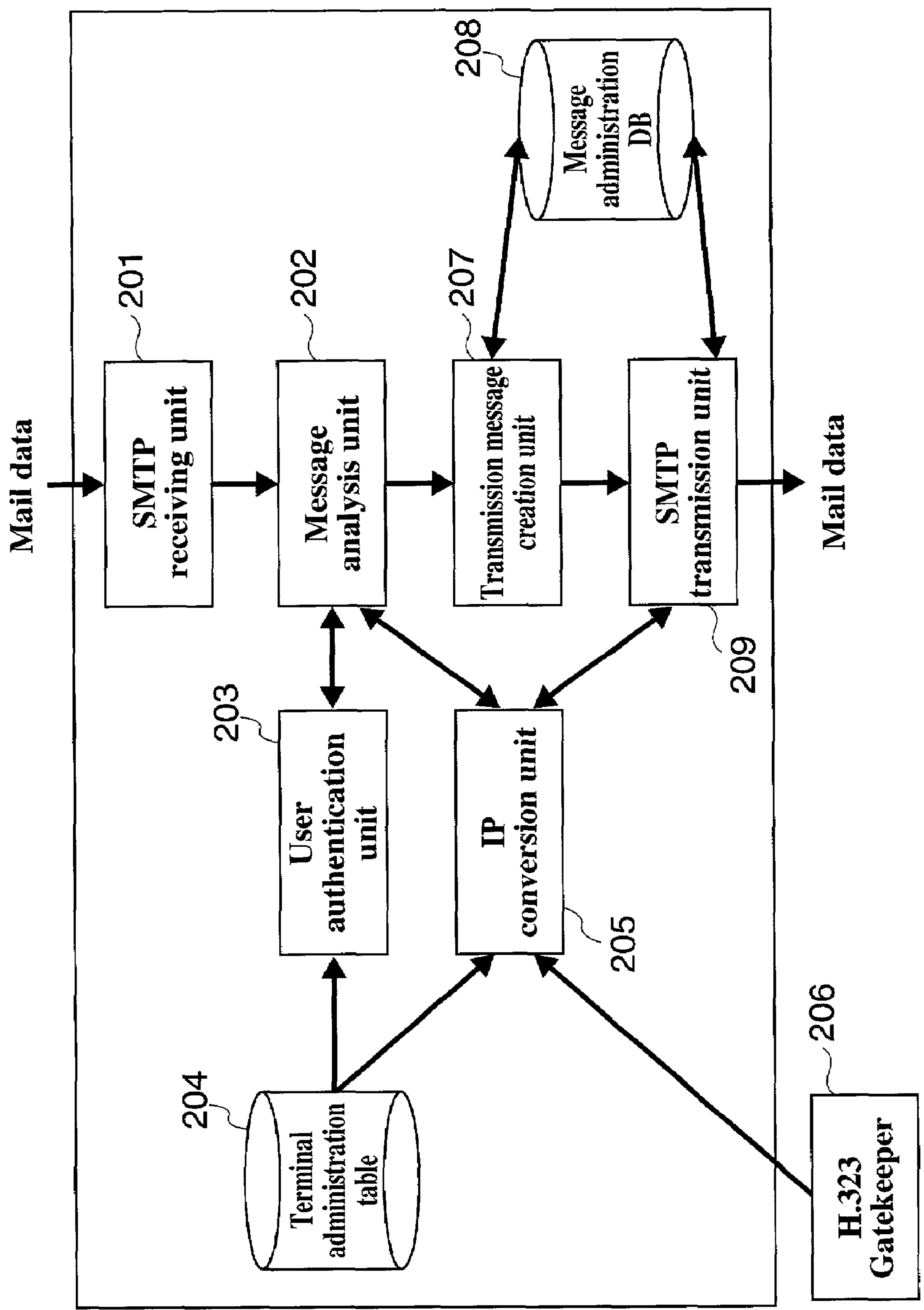
FIG. 2 is a block diagram showing the functions of the server apparatus of the embodiment according to the present invention.

FIG. 2 is a block diagram showing the functions of the server apparatus 101 of this embodiment.

In FIG. 2, a SMTP receiving unit 201 receives an electronic mail transmitted from the sender IP apparatus in accordance with the SMTP protocol. In this embodiment, as explained above, an electronic mail whose header information contains a telephone number will be received.

A message analysis unit 202 analyzes the electronic mail transmitted from the sender IP apparatus and divides it into a header information portion and a message portion. Further, the message analysis unit 202 divides a sender electronic mail address contained in the header information into a sender telephone number and a domain; yet further, it divides the destination electronic mail address into the destination account (telephone number) and a domain.

A user authentication unit 203 determines whether a user registration has been made by checking the sender telephone number and the destination telephone number. More specifically, it is determined whether user registrations were made, with reference to these telephone numbers are registered in a terminal administration table 204.

Here, with reference to FIG. 3, an example of how registrations are made in the terminal administration table 204 will be explained. FIG. 3 shows an example of data registered in the terminal administration table 204. The terminal administration table 204 can be stored in any memory unit provided in or attached to the server apparatus 101, such as a main memory (RAM), hard disks or other secondary memory.

As shown in FIG. 3, in the terminal administration table 204, in association with the telephone numbers 301, IP addresses 302, domains 303, reception functions 304 and terminal types 305 are registered. FIG. 3 shows an example in which, as terminal types, a terminal that is in compliance of the ITU-T Recommendation H.323 (hereinafter called as "H.323 Terminal") and IFAXes are registered. An IP address of the H.323 Terminal is administered by an H.323 gatekeeper (to be explained later); therefore, no fixed IP address is registered here.

An IP conversion unit 205 converts the destination telephone number designated by the sender IP apparatus to the destination IP address based on the data registered in the terminal administration table 204. as explained above, in the case in which the terminal type corresponding to the destination telephone number is an H.323 Terminal, since no fixed IP address is registered in the terminal administration table 204, the IP conversion unit 205 transmits an inquiry to the H.323 gatekeeper 206 and obtains an IP address that corresponds to the destination telephone number that is designated by the sender IP apparatus.

Incidentally, as shown in FIG. 4, the H.323 gatekeeper 206 is provided with a telephone number/IP address administration table in which IP addresses are registered in association with telephone numbers. The H.323 gatekeeper 206 responds with the IP addresses that correspond to the respective telephone numbers in response to the inquiries from the IP conversion unit 205.

A transmission message creation unit 207 creates a transmitting message for an electronic mail message received from a sender IP apparatus, which includes a message administration ID, which is capable of identifying the electronic mail. Further, predetermined information indicating the transmitting message, is registered in a message administration database (DB) 208.

Now, with reference to FIG. 5, an example of data registered in the message administration DB 208 is explained. FIG. 5 shows an example of the data that is registered in the message administration DB 208.

As shown in FIG. 5, in the message administration DB 208, in association with the message administration IDs 501, which are assigned to the transmitting messages, telephone numbers of senders 502, telephone numbers of destinations and attachment file names 504 are registered.

A SMTP transmission unit 209 transmits the transmitting messages in accordance with the SMTP protocol and in accordance with the data obtained from the massage administration DB 208, to the IP address of the destination IP apparatus, converted by the IP conversion unit 205.

Figure 6:
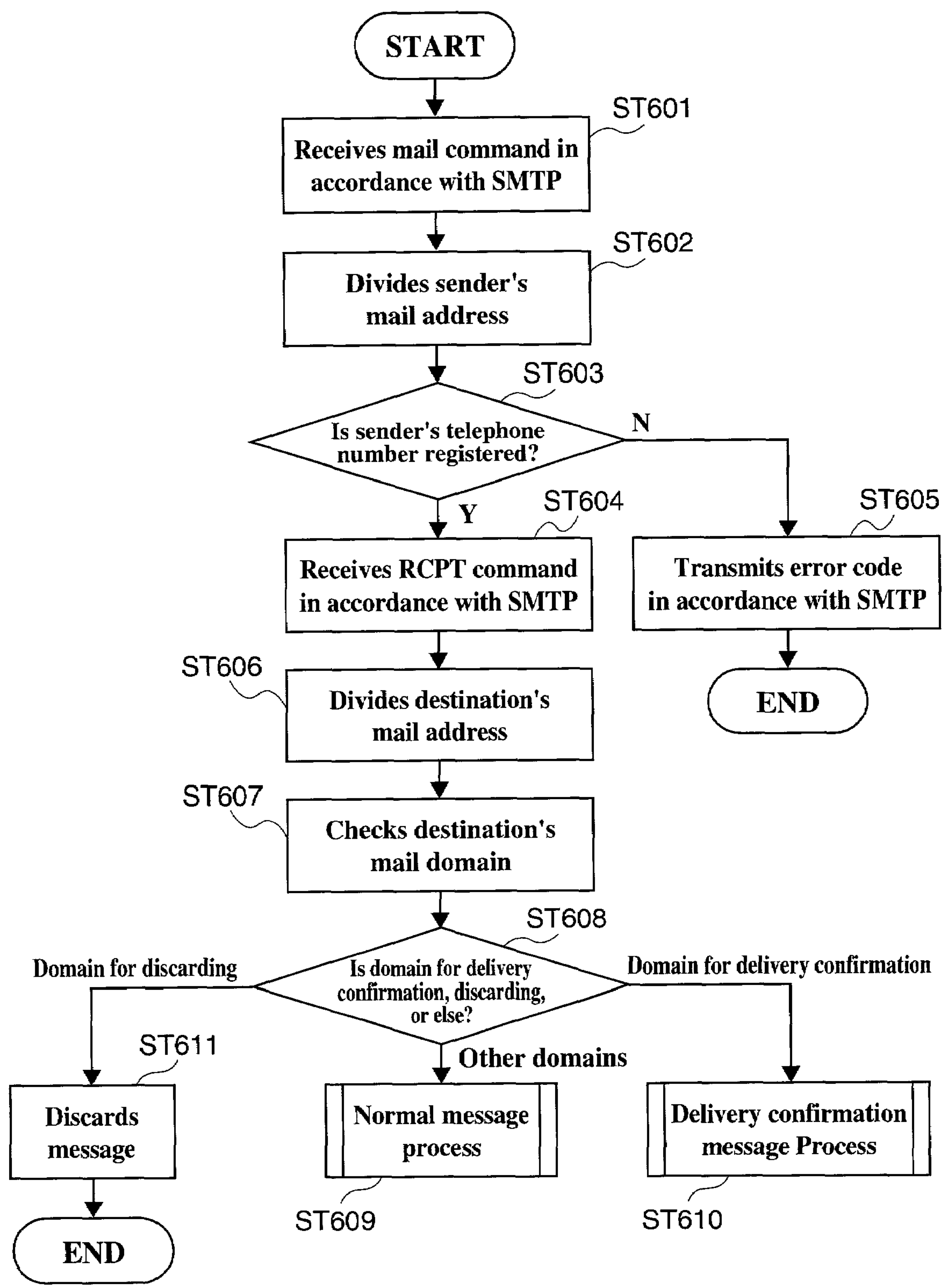
FIG. 6 is a flowchart showing the electronic mail transmission operation of the server apparatus of the embodiment according to the present invention.

Next, an electronic mail transmission operation of the server apparatus 101, which is constructed as explained above, will be explained with reference to FIG. 6. FIG. 6 is a flowchart showing the electronic mail transmission operation of the server apparatus 101. In the following discussion, an explanation will be given for a case in which the IFAX 102 is a sender IP apparatus and the IFAX 103 is a destination IP apparatus. Further, to the IFAX 102 and IFAX 103, as shown in FIG. 3, the telephone numbers "2345-67-8901" and "9999-99-9999" are assigned, respectively.

In order to transmit electronic mail to the server apparatus 101, the IFAX 102 reads a document to be transmitted through a reading screen; and thereafter, by inputting the telephone number of the destination IFAX 103, a transmission instruction is given.

In the server apparatus 101, the SMTP receiving unit 201 receives a MAIL command that is transmitted from the IFAX 102 in response to the instruction to transmit (ST601). The MAIL command includes an electronic mail address that is determined in such a way that the telephone number of the IFAX 102 (i.e., the sender) is included as a user name. More specifically, in the header information of the electronic mail, the electronic mail address "2345-67-8901@ccc" is inserted into the portion indicating the sender (i.e., "MAIL FROM:").

The message analysis unit 202 analyzes this electronic mail address of the sender and divides it into the sender telephone number and domain (ST602). In other words, from the sender electronic mail address, the telephone number "2345-67-8901" and the domain "CCC" are obtained. The sender telephone number so obtained is forwarded to the user authentication unit 203.

The user authentication unit 203 determines whether the IFAX 102 has been registered as a user, by checking whether the telephone number of this sender has been registered in the terminal administration table 204 (ST603). In the instant case, as FIG. 3 shows, since the telephone number of the IFAX 102 is registered in the terminal administration table 204, it is determined that the IFAX 102 has been registered as a user.

Upon determining that the IFAX 102 has been registered as a user, the SMTP receiving unit 201 receives a RCPT command transmitted from the IFAX 102 (ST604). The RCPT command includes the telephone number of the destination IFAX 103. More specifically, in the header information of the electronic mail, the telephone number "9999-99-9999" is inserted to the portion indicating the destination (i.e., "RCPT TO:").

Incidentally, in ST603, if the sender telephone number is not registered in the terminal administration table 204, an error code (for example, "501") will be transmitted to the sender IFAX 102 in accordance with the SMTP protocol and the transmission operation of the electronic mail will be finished (ST605).

In ST604, if the message analysis unit 202 receives a RCPT command, it analyzes the electronic mail address of the destination and divides the same into the destination telephone number and the domain (ST606). Namely, from the destination mail address, the telephone number, "9999-99-9999" (as well as the domain, in predetermined cases) is obtained. In the instant case, since only the telephone number is inserted as the electronic mail address of the destination, it will be determined that there is no domain. Incidentally, the predetermined cases in which domain will be obtained are such cases, as explained later, in which a delivery confirmation massage is processed or message discarding is processed.

After dividing the electronic mail address of the destination in ST606, the message analysis unit 202 analyzes the domain that is obtained from such dividing (ST607). More specifically, the message analysis unit 202 determines whether the obtained domain is a domain for delivery confirmation, a domain for discarding, or other domains (ST609). The domain for the delivery confirmation and the domain for discarding will be explained later. In the present case, as explained above, it is determined that there is no domain; therefore, it is treated as other domains (i.e., neither discarding or delivery confirmation).

The processes to be performed will be selected in accordance with the domain determination made in ST608. Namely, if the domain is determined as other domain, a normal message process will be selected (ST609). If the domain is determined as a domain for delivery confirmation, a message process for the delivery confirmation will be selected (ST610). Further, if the domain is determined as a domain for discarding, a process for discarding a message will be selected (ST611). In the present case, since it is determined as other domains, the normal message process will be selected.

Figure 7:
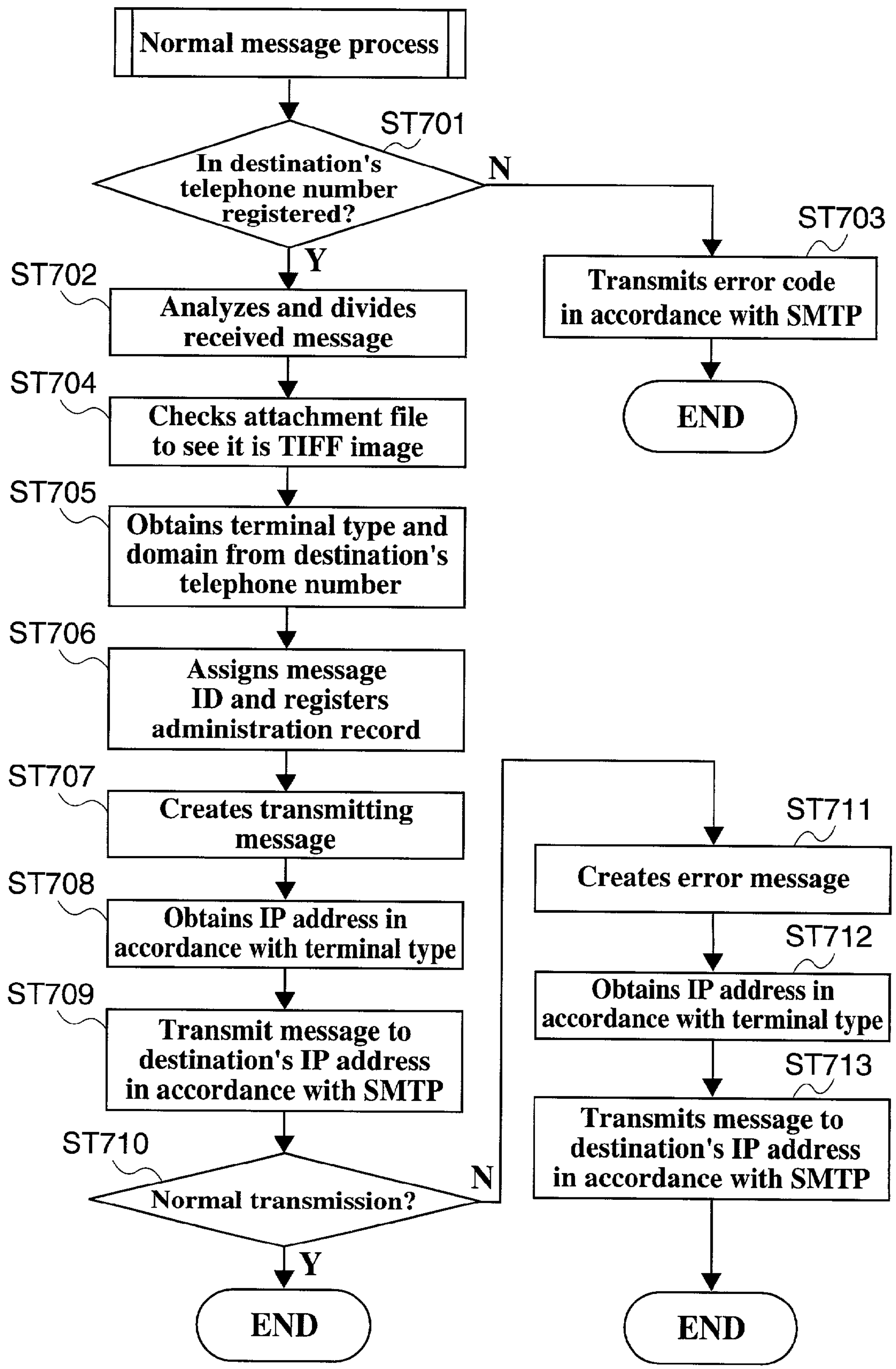
FIG. 7 is a flowchart showing the operation of the normal message process of the server apparatus of the embodiment according to the present invention.

The normal message process will be explained with reference to FIG. 7 since FIG. 7 is a flowchart showing an operation of the normal message process.

If the normal message process is selected in ST608, the user authentication unit 203 will determine whether the IFAX 103 has been registered as a user, by checking whether the destination telephone number obtained in ST606 has been registered in the terminal administration table 204 (ST701). In the present case, as shown in FIG. 3, the telephone number of the IFAX 103 is registered in the terminal administration table 204; therefore, it will be determined that the IFAX 103 has been registered as a user.

If it is determined that the IFAX 103 has been registered as a user, the message analysis unit 202 will analyze the electronic mail message received through the SMTP receiving unit 201 and divide the electronic mail message (ST702). More specifically, since the sender is the IFAX 102, the received electronic mail message will be divided into the header information and a TIFF (Tagged Image File Format) file.

Incidentally, in case that the telephone number of the destination has not been registered in the terminal administration table 204, an error code (for example, 550 or 551) will be transmitted to the sender, i.e., the IFAX 102, in accordance with the SMTP protocol and the transmission operation of electronic mail will be finished (ST703).

After dividing the received electronic mail message into the header information and the TIFF file in ST702, the message analysis unit 202 will determine whether the attachment file to the received electronic mail message is of TIFF image (ST704). In other words, it is determined whether the attached file is compressed, for example, in accordance with the MH compression format. More specifically, by checking the header information of the TIFF file, which is attached to the multi-part mail in accordance with the MIME (Multipurpose Internet Mail Extension), it is determined whether the attached file to the electronic mail message is the TIFF image.

The IP conversion unit 205 receives the destination telephone number obtained by the message analysis unit 202. And, using this telephone number, the IP conversion unit searches the terminal administration table 204 and obtains the terminal type and the domain of the destination (ST705). In this instant case, as the terminal type, "IFAX" will be obtained, and as the domain, "BBB" will be obtained. The terminal type and domain so obtained are forwarded to the SMTP transmission unit 209.

On the other hand, the transmission message creation unit 207 assigns a message administration ID to the electronic mail message received from the IFAX 102 taking into account the determination results in ST704. At this time, the transmission message creation unit 207 registers an administrative record, indicating the contents of this transmitting message, unit 207 registers an administrative record, indicating the contents of this transmitting message, in the message administration DB208 (ST706). This administrative record includes, as shown in FIG. 5, the message administration ID 501, the sender telephone number 502, the destination telephone number 503, the name of the attachment file 504, etc. In the present case, more specifically, as shown at the upper most column in FIG. 5, the administrative record whose message administration ID is "100" is recorded.

Further, the transmission message creation unit 207 creates a transmitting message, in which a sender electronic mail includes the above described message administration ID (100) as a user name and a domain for delivery confirmation as a domain (ST707). Here, a domain for delivery confirmation can be any domain, however, for example, it is assumed that "svr.confirm" is used. Therefore, in the present case, such a transmitting message including "100@svr.confirm" as a sender electronic mail address, will be created. The transmitting message so created is forwarded to the SMTP transmission unit 209.

When the transmitting message is created, the IP conversion unit 205 obtains an IP address of the destination in accordance with the destination terminal type obtained in ST705 (ST708). More specifically, if the terminal type of the destination is an IFAX, an IP address will be obtained from the terminal administration table 204, and if the terminal type of the destination is an H.323 terminal, an IP address will be obtained by communicating with an H.323 gatekeeper 206 (H.323 LPQ/LCF). In the instant case, since the destination terminal type is the IFAX 103, the IP conversion unit 205 obtains the IP address (133.185.250.12) from the terminal administration table 204. The IP address so obtained is forwarded to the SMTP transmitting unit 209.

Upon receiving this IP address, the SMTP transmission unit 209 transmits the transmitting message created in ST707 to the designated (obtained) IP address, in accordance with the SMTP protocol (ST709). At this time, the SMTP transmission unit 209 determines the destination electronic mail address by referring to the administrative record that corresponds to the message administration ID of the subject to be transmitted (i.e., "100" in this embodiment), registered in the message administration DB208. More specifically, the destination electronic mail address is determined in such a way that the telephone number of the destination is included as the user name. In this instant case, the destination electronic mail address, included in the transmitting message, will be determined as "9999-99-9999@BBB".

Upon transmission of the transmitting message, the SMTP transmission unit 209 determines whether the electronic mail transmission has been completed normally. Here, if the transmission of the electronic mail has been completed normally, the transmission operation of electronic mail will be finished. On the other hand, if the transmission of the electronic mail has not been completed normally due to some reason, including, for example that the electric power of the destination IFAX 103 has not been turned on, the transmitting message creation unit 207 will be notified of the incomplete transmission.

Upon reception of this notification, the transmission message creation unit 207 creates an error mail message including: as a main text, a predetermined message indicating contents (details) of error; and as an attachment file, the transmitting message that could not be transmitted (ST711). This error mail message will be forwarded to the SMTP transmission unit 209.

When the error mail message is created, the IP conversion unit 205 obtains the sender's IP address in the same way as in ST708 depending on the terminal type of the sender (IFAX 102) that has been registered in the terminal administration table 204 (ST712). In the instant case, since the terminal type of the sender is the IFAX 102, the IP conversion unit 205 will obtain the IP address (133.185.250.13) from the terminal administration table 204. The IP address so obtained will be forwarded to the SMTP transmission unit 209.

Upon receipt of this IP address, the SMTP transmission unit 209 transmits the error mail message created in ST711 to the designated IP address in accordance with the SMTP protocol (ST713) and completes the electronic mail transmission operation.

Figure 8:
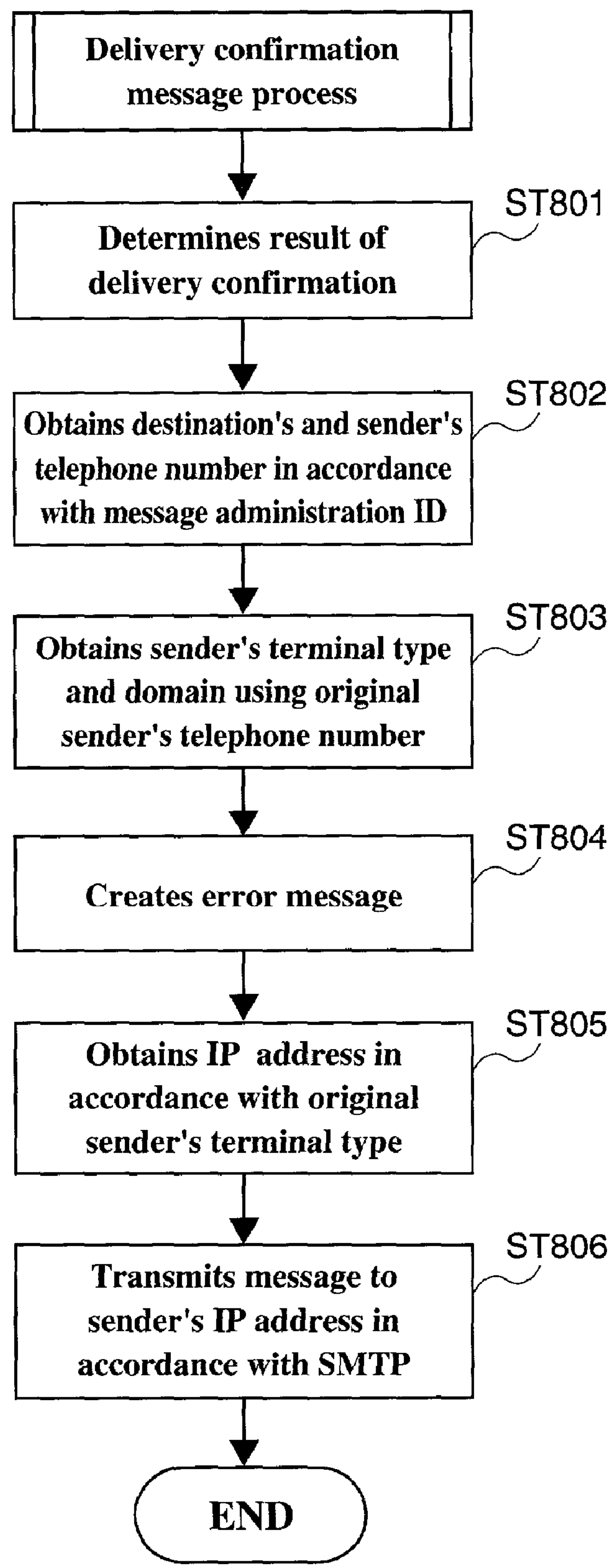
FIG. 8 is a flowchart showing a procedure for registering a default domain name in the IFAX of the embodiment.

Next, the delivery confirmation message process (ST610) that will be executed when a domain for delivery confirmation is determined in ST608 in FIG. 6 will be explained with reference to FIG. 8. FIG. 8 is a flowchart showing the operation of the delivery confirmation message process of the server apparatus 101.

Here the delivery confirmation message process will be explained. The delivery confirmation message process is a process that, when, for whatever reasons, a transmitting message from the server apparatus 101 is not delivered to the destination IP apparatus, the destination IP apparatus transmits a predetermined delivery confirmation message to the sender IP apparatus. In the following explanations, it is assumed that, since the transmitting message form the above described IFAX 102 does not arrive at the IFAX 103, the IFAX 103 will execute the delivery confirmation message process.

In this delivery confirmation message process, how determinations for the delivery confirmation in the server apparatus should be made can be freely determined. For example, it may be determined to transmit a delivery confirmation message from the destination IP apparatus only when a transmitting message from the server apparatus 101 does not arrive at the destination IP apparatus. In this case, when that delivery confirmation message is received, it can be determined that the transmitting message has not been delivered. It may also be determined to transmit a delivery confirmation message in every case in response to the transmitting of messages form the server apparatus 101. In this case, depending on the contents of the delivery confirmation message, it can be determined whether the transmitting message has been delivered. In this instant case, the former way of determination is adopted.

Incidentally, in the header information of this delivery confirmation message, the sender electronic mail address and the destination electronic mail address that are contained in the header information of the transmitting message from the above described IFAX 102 are switched (exchanged). Thus, in the above example, as a sender electronic mail address, "9999-99-9999@BBB", which was originally the destination mail address, is designated; and as a destination electronic mail address, "100@svr.confirm", which was originally the sender mail address, is designated.

In the delivery confirmation message process, the processes from ST601 through ST608 described in FIG. 6 are to be executed in the same way. Note that, in ST606, a destination electronic mail address of the delivery confirmation message is analyzed and divided into the message administration ID (100) of a transmitting message that is not delivered to the IFAX 103 and a domain for delivery confirmation (svr.confirm). These message administration ID, etc. will be forwarded to the transmitting message creation unit 2207. Further, in ST608, the delivery confirmation message process will be selected.

If the delivery confirmation message process is selected, the result of the delivery confirmation will be determined in accordance with the setting of delivery confirmation determinations as described above (ST801). In the present case, since a delivery confirmation message has been received from the IFAX 103, it is determined that the transmitting message from the IFAX 102 has not arrived at the IFAX 103.

When the result of the delivery confirmation is determined in ST801, the SMTP transmission unit 209 obtains the telephone numbers of the original sender (IFAX 102) and the original destination (IFAX 103) from the message administration DB 208 in accordance with the message administration ID (100) that has been received via the message analysis unit 202 and the transmitting message creation unit 207 (ST802).

The IP conversion unit 205 obtains the telephone number of the original sender (IFAX 102) from the SMTP transmission unit 209; and using this telephone number, searches the terminal administration table 204; and obtains the terminal type and the domain of the original sender (IFAX 102) (ST803). In this instant case, the terminal type of sender IFAX 102, i.e., "IFAX", and the domain "CCC" will be obtained. The terminal type and the domain of the original sender (IFAX 102) so obtained are forwarded to the SMTP transmission unit 209.

On the other hand, the transmitting message creation unit 207 creates an error mail message including: as a main text, the message indicating that the transmitting message has not been arrived; and as an attachment file, the transmitting message that could not be transmitted (ST804). This error mail massage will be forwarded to the SMTP transmission unit 209.

Incidentally, the transmitting message creation unit 207 determines a sender electronic mail address included in the header information of the delivery confirmation message, in such a way that the telephone number (9999-99-9999) of the original destination (IFAX 103) forms the user name portion, and a domain for discarding forms the domain portion. The domain for discarding may be anything; but, for example, "svr.delete" may be used. In this instant case, the sender electronic mail address is determined as "9999-99-9999@svr.delete".

The IP conversion unit 205 obtains the IP address, in the same way as in ST708 or ST712, in accordance with the terminal type of the original sender (IFAX 102) that is obtained ST803 (ST805). In the present case, the terminal type of original sender is the IFAX 102 so that the IP conversion unit 205 obtains the IP address (133.185.250.13) from the terminal administration table 204. The IP address so obtained will be forwarded to the SMTP transmission unit 209.

Upon receiving this IP address, the SMTP transmission Unit 209 transmits the error mail message that has been created in ST804 to the designated IP address (received from the IP conversion unit in ST805) in accordance with the SMTP protocol (ST806). And, after transmitting the error mail message, the transmission operation of electronic mail is finished.

Next, the process to discard the message that will be executed when it is determined to be a domain for discarding in ST608 in FIG. 6 will be explained. This process prevents an infinite loop of electronic mail communication that can occur in such a way that the original sender of IFAX 102 that has received a delivery confirmation message transmits an error mail message to the original destination of IFAX 103.

In this message discarding process, the processes described from ST601 through ST608 in FIG. 6 are executed in the same way. In this case, this process is selected when in ST608, a domain for discarding (svr.delete) is detected. And, in this case, the received electronic mail message is discarded (ST611) and the electronic mail transmission operation is finished.

As explained above, by using the server apparatus 101 of this embodiment, either IP addresses that are registered in the terminal administration table 204 in association with the telephone numbers of destinations, or IP addresses that are notified by an H.323 gatekeeper, etc., in response to an inquiry, in accordance with terminal types registered in the terminal administration table 204, are obtained. Therefore, even if an operator of a sender apparatus does not know information of the destination, such as a mail account, etc., in advance, if he/she knows of the telephone number of the destination, an electronic mail can be transmitted.

As explained in the foregoing, according to the present invention, and IP address that corresponds to the telephone number designated by a sender is obtained, so that even if the information of the destination, such as a mail account, etc., is not known in advance, electronic mail communications can be performed.

It is noted that the foregoing examples have been provided merely for the purpose of explanation and are in now way to be construed as limiting of the present invention. While the present invention has been described with reference to certain embodiments, it is understood that the words which have been used herein are words of description and illustration, rather than words of limitation. Changes may be made, within the purview of the appended claims, as presently stated and as amended, without departing from the scope and spirit of the present invention in its aspects.

Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The present disclosure relates to subject matter contained in priority Japanese Application No. 2000-366839, filed on Dec. 1, 2000, which is herein expressly incorporated by reference in its entirety.

What is claimed is:

1. A server apparatus connected to a transmitting IP apparatus, the transmitting IP apparatus transmitting an e-mail to a receiving IP apparatus via the server apparatus, the server apparatus comprising:

a memory configured to store an IP address of the receiving IP apparatus in association with a telephone number of the receiving IP apparatus, the IP address of the receiving IP apparatus being distinct from an e-mail address;

a receiver configured to receive the e-mail from the transmitting IP apparatus, the e-mail including the telephone number of the receiving IP apparatus;

an analyzer configured to obtain, from the received e-mail, the telephone number of the receiving IP apparatus, and to obtain, from the memory, the IP address of the receiving IP apparatus associated with the telephone number of the receiving IP apparatus, the receiving IP apparatus of the IP address, being the same as the receiving IP apparatus of the telephone number;

a converter configured to determine, based upon the telephone number of the receiving IP apparatus, a terminal type and a domain of the receiving IP apparatus and to determine, based upon the terminal type, the IP address of the receiving IP apparatus; and a transmitter configured to transmit the received e-mail to the receiving IP apparatus of the telephone number, based on the stored IP address of the receiving IP apparatus.

2. The server apparatus according to claim 1, wherein the transmitter transmits an error message to the transmitting IP apparatus when the memory does not store the IP address of the receiving IP apparatus in association with the telephone number of the receiving IP apparatus.

3. The server apparatus according to claim 1 further being connected to a H.323 gatekeeper, the H.323 gatekeeper storing the IP address of the receiving IP apparatus in association with the telephone number of the receiving IP apparatus, the analyzer being configured to determine whether the memory stores the IP address of the receiving IP apparatus, and when it is determined that the memory does not store the IP address of the receiving IP apparatus, the transmitter accesses the H.323 gatekeeper to obtain the IP address of the receiving IP apparatus.

4. The server apparatus according to claim 1, wherein a header of the e-mail from the transmitting IP apparatus includes the telephone number of the receiving IP apparatus.

5. The server apparatus according to claim 1, wherein the transmitter transmits the received e-mail to the receiving IP apparatus, based on the IP address of the receiving IP apparatus, in accordance with a SMTP protocol.

6. The server apparatus according to claim 1, the analyzer being further configured to determine, from a first portion of a header of the received e-mail, a telephone number of a sender of the e-mail, and to determine, from a second portion of the header of the received e-mail, a telephone number of a destination of the received e-mail, the destination of the received e-mail comprising the receiving IP apparatus.

7. The server apparatus according to claim 1, the telephone number of the receiving IP apparatus being utilized to obtain the IP address of the receiving IP apparatus, and the obtained IP address of the receiving IP apparatus being utilized to transmit, without utilizing the telephone number of the receiving IP apparatus, the e-mail to the receiving IP apparatus.

8. A communication system comprising:

a transmitting IP apparatus; and a server apparatus, the transmitting IP apparatus comprising:

a panel configured to input a telephone number of a receiving IP apparatus; and a transmitter configured to transmit, to the server apparatus, an e-mail including the input telephone number of the receiving IP apparatus, the server apparatus comprising:

a memory configured to store an IP address of the receiving IP apparatus in association with the telephone number of the receiving IP apparatus, the IP address of the receiving IP apparatus being distinct from an e-mail address;

an analyzer configured to receive the e-mail from the transmitting IP apparatus, to obtain, from the received e-mail, the telephone number of the receiving IP apparatus, and to obtain, from the memory, the IP address of the receiving IP apparatus associated with the telephone number of the receiving IP apparatus, the receiving IP apparatus of the IP address is related being the same as the receiving IP apparatus of the telephone number is related;

a converter configured to determine, based upon the telephone number of the receiving IP apparatus, a terminal type and a domain of the receiving IP apparatus, and to determine, based upon the terminal type, the IP address of the receiving IP apparatus; and a transmitter configured to transmit the received e-mail to the receiving IP apparatus of the telephone number, based on the stored IP address of the receiving IP apparatus.

9. The communication system according to claim 8, the analyzer of the server apparatus being further configured to determine, from a first portion of a header of the received e-mail, a telephone number of a sender of the e-mail, and to determine, from a second portion of the header of the received e-mail, a telephone number of a destination of the received e-mail, the destination of the received e-mail comprising the receiving IP apparatus.

10. The communication system according to claim 8, the telephone number of the receiving IP apparatus being utilized to obtain the IP address of the receiving IP apparatus, and the obtained IP address of the receiving IP apparatus being utilized to transmit, without utilizing the telephone number of the receiving IP apparatus, the e-mail to the receiving IP apparatus.

11. A method for controlling an e-mail transmission using a server apparatus, the method comprising:

storing, at the server apparatus, an IP address of a receiving IP apparatus in association with a telephone number of the receiving IP apparatus, the IP address of the receiving IP apparatus being distinct from an e-mail address;

receiving, from a transmitting IP apparatus, an e-mail, the e-mail including the telephone number of the receiving IP apparatus;

obtaining, from the received e-mail, the telephone number of the receiving IP apparatus;

obtaining, the IP address of the receiving IP apparatus stored in association with the telephone number of the receiving IP apparatus, the receiving IP apparatus of the stored IP address is related being the same as the receiving IP apparatus of the stored telephone number;

determining, based on the telephone number of the receiving IP apparatus, a terminal type and a domain of the receiving IP apparatus and determining, based upon the terminal type, the IP address of the receiving IP apparatus; and transmitting the received e-mail from the server apparatus of the telephone number, based on the stored IP address of the receiving IP apparatus.

12. The method for controlling an e-mail transmission according to claim 11, further comprising determining, from a first portion of a header of the received e-mail, a telephone number of a sender of the e-mail, and to determine, from a second portion of the header of the received e-mail, a telephone number of a destination of the received e-mail, the destination of the received e-mail comprising the receiving IP apparatus.

13. The method for controlling an e-mail transmission according to claim 11, further comprising utilizing the telephone number of the receiving IP apparatus to obtain the IP address of the receiving IP apparatus and utilizing the obtained IP address of the receiving IP apparatus to transmit, without utilizing the telephone number of the receiving IP apparatus, the e-mail to the receiving IP apparatus.

* * * * *